(12) United States Patent
Reid (10) Patent No.: US 12,257,983 B2
(45) Date of Patent: Mar. 25, 2025

(54) BAG HOLDER

(71) Applicant: Lisa Reid, Milwaukie, OR (US)

(72) Inventor: Lisa Reid, Milwaukie, OR (US)

( * ) Notice: Subject to any disclaimer, the term of this patent is extended or adjusted under 35 U.S.C. 154(b) by 76 days.

(21) Appl. No.: 18/169,169

(22) Filed: Feb. 14, 2023

(65) Prior Publication Data

US 2024/0270175 A1 Aug. 15, 2024

(51) Int. Cl.
*B60R 7/08* (2006.01)
(52) U.S. Cl.
CPC ..................................... *B60R 7/08* (2013.01)
(58) Field of Classification Search
CPC ..... B60R 7/08; B65F 1/1415; A44B 17/0023; A44B 17/0035; A44B 17/0041; A44B 17/007; A44B 17/0076; A47B 17/0029
USPC ........ 248/309.1, 95, 99, 101; 24/487, 581.1, 24/594.1, 549.11
See application file for complete search history.

(56) References Cited

U.S. PATENT DOCUMENTS

| | | | | |
|---|---|---|---|---|
| 4,962,573 A | * | 10/1990 | Breveglieri | ........ A44B 17/0029 24/324 |
| 5,103,538 A | * | 4/1992 | Ryder | ................ A44B 17/0023 24/453 |
| 5,261,553 A | * | 11/1993 | Mueller | .................... B65F 1/06 248/101 |
| 10,681,965 B1 | * | 6/2020 | Emile | .................. A44C 27/001 |
| 2011/0113600 A1 | * | 5/2011 | Hasegawa | .......... A44B 17/0023 24/594.11 |
| 2012/0124791 A1 | * | 5/2012 | Hasegawa | ............ A44B 17/007 24/596.1 |
| 2019/0144203 A1 | * | 5/2019 | Jetter | .................. B65B 67/1238 248/99 |
| 2019/0185214 A1 | * | 6/2019 | Reid | .................... F16M 13/022 |
| 2019/0185215 A1 | * | 6/2019 | Reid | .................... B65F 1/1415 |

* cited by examiner

*Primary Examiner* — Christopher Garft
(74) *Attorney, Agent, or Firm* — Mark S Hubert PC (57) ABSTRACT

A bag holder that affixes mechanically or chemically to any surface and frictionally grips the back side of a polymer or paper bag so as to hold it vertically open and ready for the deposit of trash. It has two capture members that are hingeably connected. One of the capture members has a planar flange extending from its bottom perimeter from which the bag holder is attached.

8 Claims, 9 Drawing Sheets

BAG HOLDER

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to trash collection, and more particularly to an apparatus for constraining a polymer bag.

BACKGROUND

Vehicles have limited room for holding garbage. There are no built-in garbage holders, just pockets strewn about the vehicle, generally located in the door panels and behind the seats. While this is good for temporary storage of dry goods, it does not lend itself to the collection of wet, oily, sticky or generally surface messy items. This task is relegated to smaller polymer garbage bags. However, vehicles do not have built in devices to hold these garbage bags open and to hold them vertically from spilling their contents.

Similarly, there are a plethora of places that need an open and accessible garbage bag that can be affixed locally, such as at a workbench, desk, cash register, or work station.

While there are different devices to constrain polymer bags vertically, most of these fail and allow the bag to dislodge when a heavy item is dropped therein. Simply stated, their holding power is wanting.

Henceforth, an apparatus for securely holding a thin flexible bag of polymer or paper construction, that may be affixed in numerous different ways to the surrounding environment, would fulfill a long felt need. This new invention utilizes and combines known and new technologies in a unique and novel configuration to overcome the aforementioned problems and accomplish this.

BRIEF SUMMARY

In accordance with various embodiments, an apparatus for holding a plastic bag in a vertical position, is provided.

In one aspect, an apparatus for frictionally enhanced engagement of a thin flexible material.

In another aspect, an apparatus for constraining a polymer bag vertically that can be attached by its base quickly, in different ways, and easily in a multitude of places.

In yet another aspect, an apparatus for constraining a polymer bag that may be attached with a mechanical fastener, or an adhesive.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

It will be understood that, although the terms first, second, etc. may be used herein to describe various elements (members), these elements should not be limited by these terms. These terms are only used to distinguish one element (member) from another. For example, a first element (member) could be termed a second element (member), and, similarly, a second element (member) could be termed a first element (member), without departing from the scope of the inventive concept. In this specific design the base may be attached to either the first element or the second element.

It will be understood that when an element or member is referred to as being "engaged with," "coupled to," or "connected to" another element or member, it can be directly on, directly coupled to or directly connected to the other element or member, or intervening layers may be present such as a polymer bag.

The present invention relates to a novel design for an attachable apparatus that constrains a thin, flexible material such as a portion of one side of a polymer or paper bag.

Figure 8:
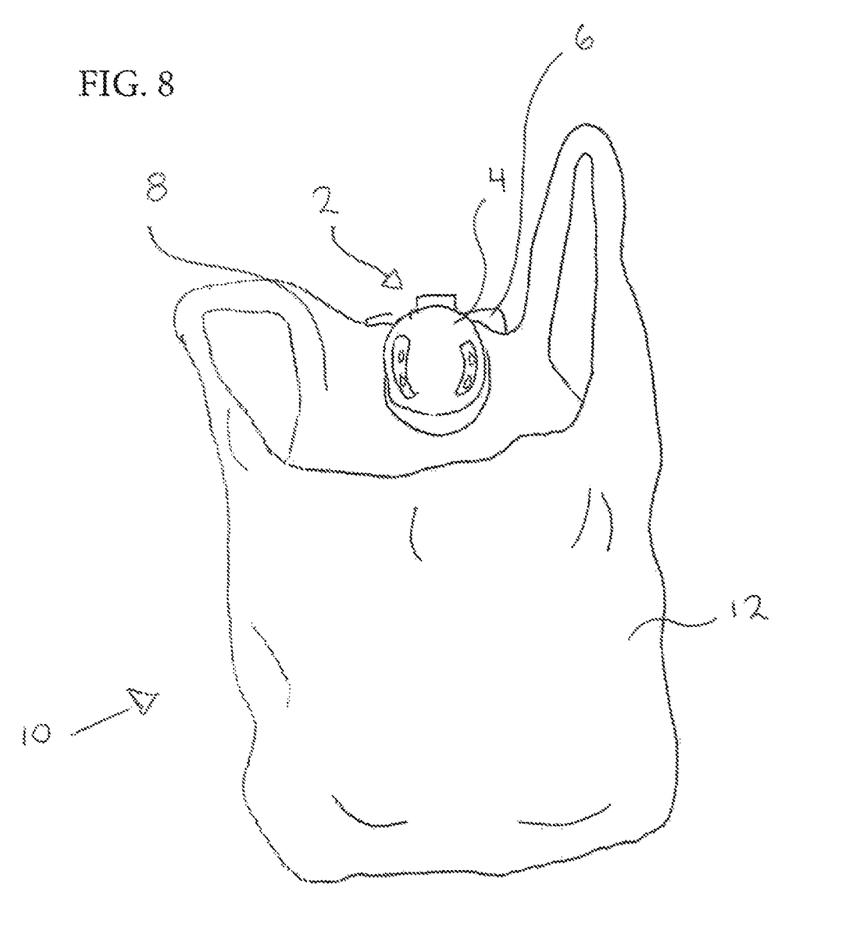
FIG. 8 is a perspective view of the bag holder with an ensnared plastic bag.

Looking at FIG. 8 the bag holder can best be seen in use. Here, the bag holder 2 can be seen with its first capture member 4 mechanically and frictionally connected to its matingly conforming second capture member 6 so as to trap and constrain the back side 8 of a polymer bag 10, supporting the bag 10 and allowing the front side 12 of the bag 10 to hang open. This allows any size of a bag 10 to be mounted in an open configuration at a convenient location such as on the dash of a vehicle or the inside of a cabinet.

Looking at FIGS. 1-4 the physical structure and configuration of the bag holder 2 can be seen. The bag holder 2 has two components, a first capture member 22 and a second capture member 24. There may be an optional hinge means 26 connecting the first capture member 22 and the second capture member 24 or not. Preferably the hinge means 26 connects between the side walls of the two members 22 and 24. The hinge means 26 is not necessary for the functioning of the bag holder 2 as its function is just to keep the two members 22 and 24 from being separated and lost. There is also an optional base flange 28 that extends perpendicularly from the exterior bottom edge of either the first capture member 22 or the second capture member 24. In the provided (preferred) embodiment herein, the base flange 28 extends from the second capture member 24. If the first capture member 22 was interchanged with the second capture member 24 the base flange could extend from the first capture member 22.

This base flange 28 serves to stabilize the bag holder 2 on whatever it is mounted to so as to spread out the forces that would act to dislodge the bag holder 2 from whatever surface it was mounted to as the bag fills and its increasing weight gravitationally pulls on the bag 10 and bag holder 2. The base flange 28 also provides two base flange cutouts 16 on either side of the capture member it is formed on.

The first capture member 22 has a cylindrical configuration, preferably that of a right circular cylinder, although outer geometric cylindrical shapes such as rectangular, elliptical, hexagonal or the like, would also work. The first capture member 22 has a planar top plate 30 with a pair of opposing crescent shaped slots 34 formed therein, 180 radial degrees apart at their midpoints. The top plate 30 encloses the top end of the cylindrical configuration. There is also a release tab 32 extending from the front bottom side of the first capture member 22 that allows pressure to be applied to separate the bag holder 2 to be separated into its to members 22 and 24. The inside, bottom edge of the first capture member 22 has a slight outward chamfer 36 for ease of engagement between the two capture members 22 and 24.

Formed on the inner side wall 38 of the first capture member 22 is a partially circumferential locking groove 40 formed adjacent and below each of the crescent shaped slots 34. This locking groove 40 allows the partially circumferential locking tabs 42 formed on the outer side wall 44 of the second capture member 24 to reside in when the bag holder 2 is in its closed configuration. Since the bag holder 2 is made of a polymer of a sufficient durometer to allow slight elastic deformation, the side wall of the second capture member 24 flexes slightly inward while the side wall of the first capture member flexes slightly outward to allow the engagement of these locking tabs 42 into the locking groove 40. The locking tabs 42 have slight chamfers 46 on both its top and bottom edges for ease of engagement and disengagement.

The second capture member 24 has a right cylindrical configuration that is frictionally engagable with the first capture member 22. The outer diameter of the second capture member 24 approximates but is slightly smaller than the inner diameter of the first capture member 22 to allow this to occur during engagement. There are locking tabs 42 formed on the outer side wall 44 of the second capture member 24 as discussed above as well as a set of teeth 46 that extend from the top edge 50 of the second capture member 24. Although illustrated with only two pair of teeth 46, there can be any number of these teeth 46 in the set of teeth. These sets of teeth 46 are disposed 180 degrees apart on the top edge 50, and reside aligned with the crescent shaped slots 34 formed on the first capture member 22.

Figure 1:
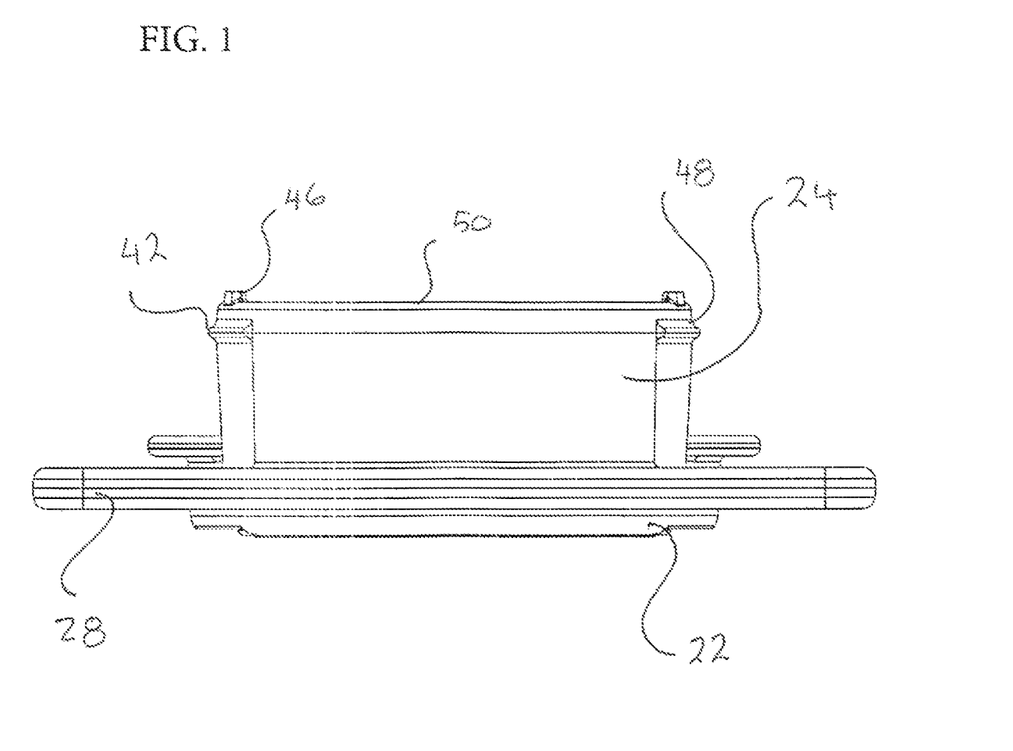
FIG. 1 is a front view of the bag holder.
Figure 2:
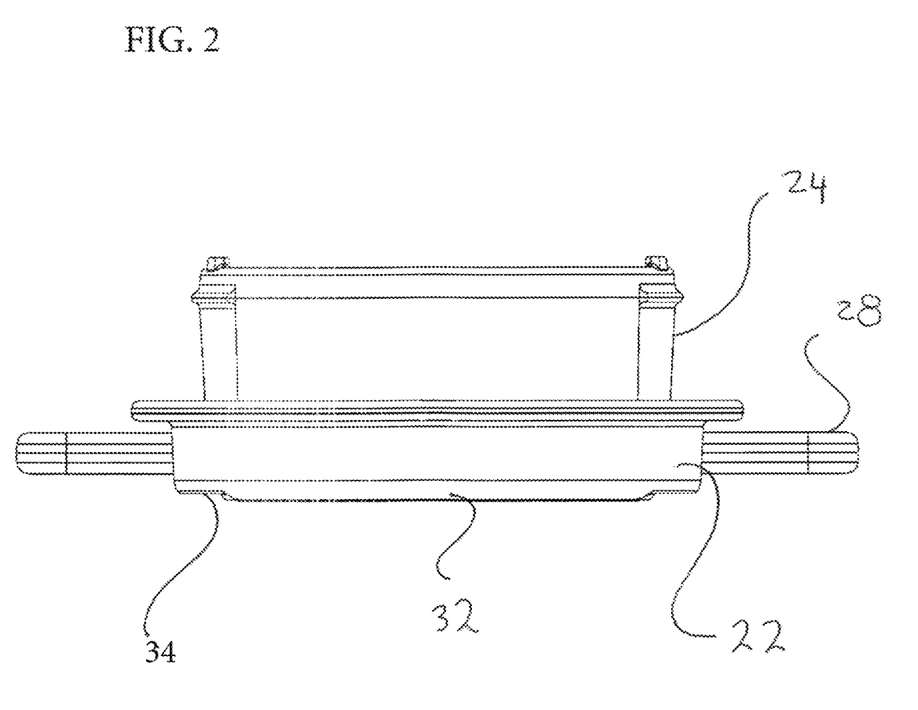
FIG. 2 is a rear view of the bag holder.
Figure 3:
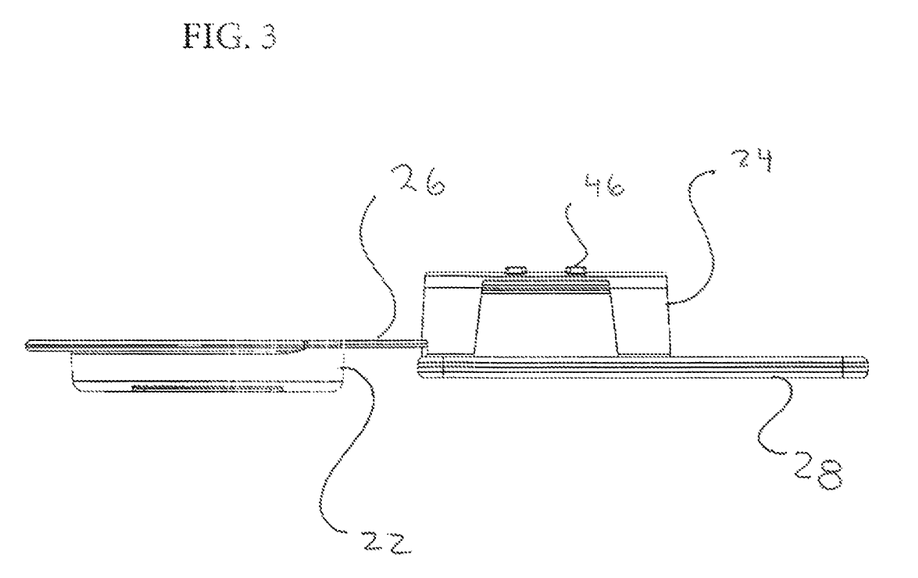
FIG. 3 is a left side view of the bag holder.
Figure 4:
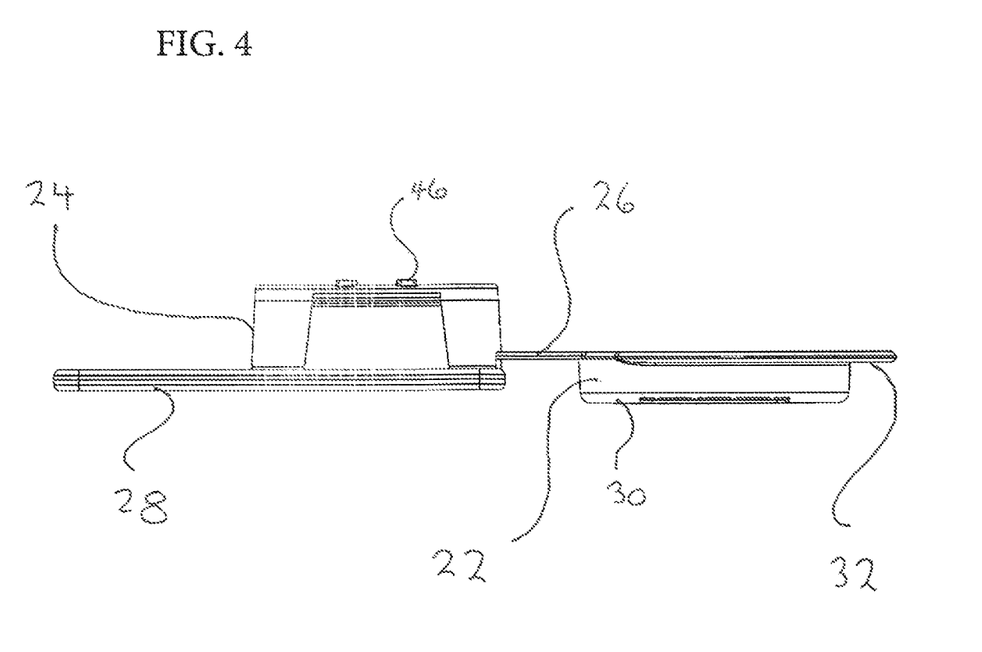
FIG. 4 is a right side view of the bag holder.
Figure 5:
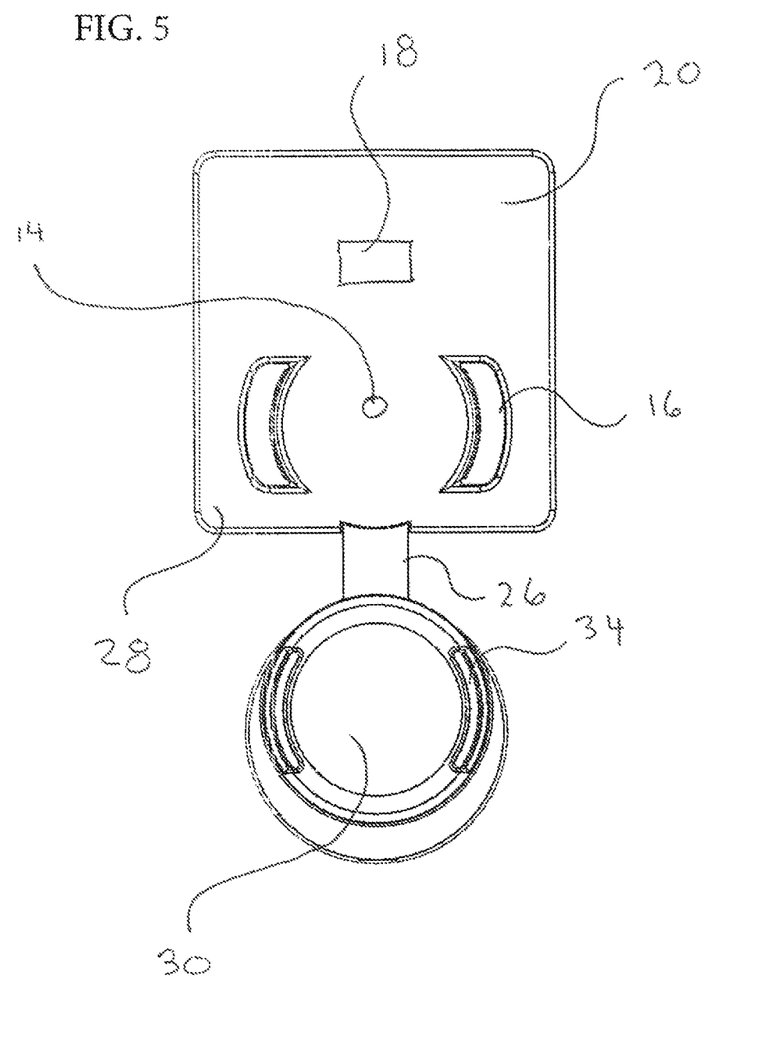
FIG. 5 is a bottom view of the bag holder.
Figure 6:
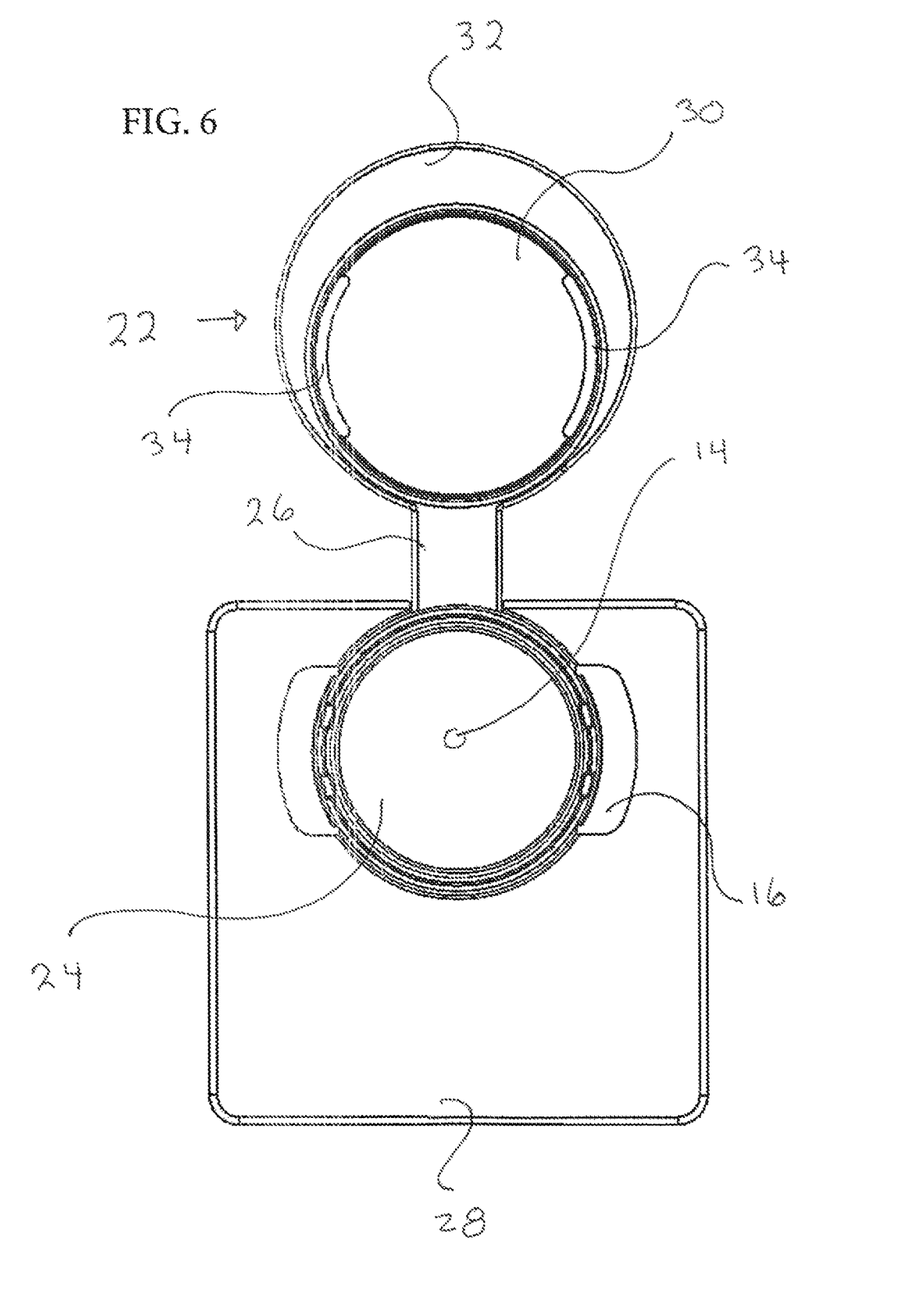
FIG. 6 is a top view of the bag holder.
Figure 7:
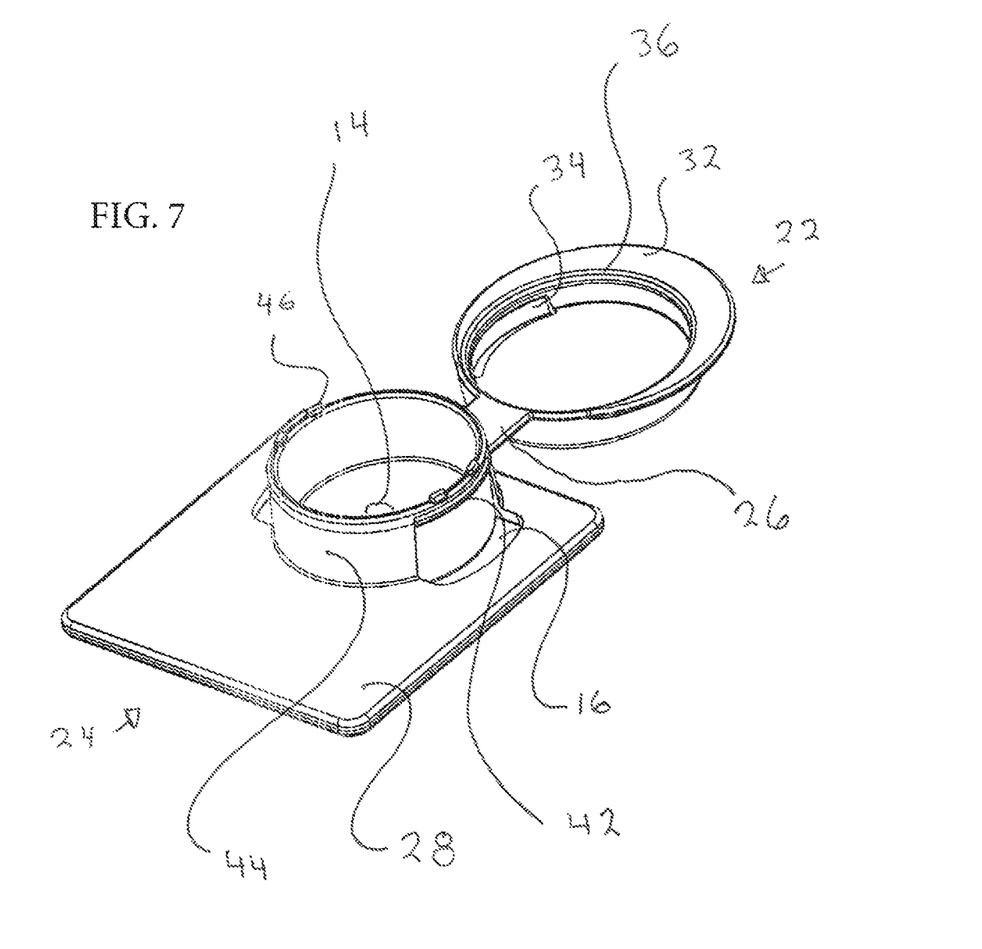
FIG. 7 is a perspective view of the bag holder.

The bag holder 2 may be removably or permanently attached to adjacent structures in three ways. It may be mechanically fastened with a screw, bolt, pin, rivet or any functional equivalent that passes through the central orifice 14 (FIGS. 5-7) into an adjacent structure. It may be strapped onto/around an adjacent structure with one or two cable ties, lengths of string/rope, elastic cords or any functional equivalent, that pass through one or two of the base flange cutouts 16 (FIGS. 5-7). Lastly. It may be affixed to an adjacent structure by an adhesive means 18 such as two sided tape or an adhesive applied to the planar solid floor 20 of the base flange 28. (FIG. 5)

Figure 9:
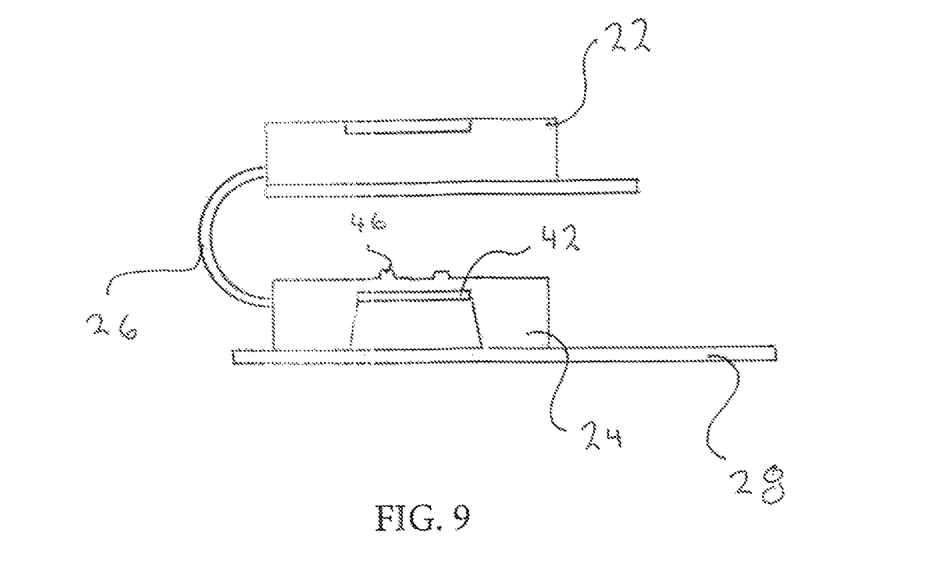
FIG. 9 is a side view of the bag holder with its first capture member positioned above the second capture member.
Figure 10:
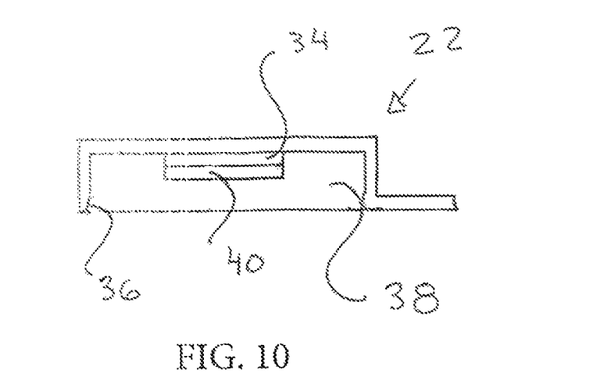
FIG. 10 is a side cross sectional view of the first capture member of the bag holder.

FIGS. 9 and 10 illustrate how the bag holder 2 functions. Both frictional and mechanical engagement are used to secure the back side 8 of the bag 10. Once affixed by any of the three methods to an adjacent structure, the first capture member 22 of the bag holder 2 is separated from the second capture member 24, being held in a spaced proximity by the hinge means 26. The top of the back side 8 of a bag 10 is placed across the top edge 50 of the second capture member 24 and held in place while the first capture member 22 is placed atop the second capture member 24 and the two members 22 and 24 are forcibly engaged. In the engagement process, the slight larger inner side wall 38 of the first capture member 22 slides around the mating, slightly smaller outer side wall 44 frictionally entrapping the bag 10. The two locking tabs 42 pass up the inner side wall 38 of the first capture member 22 until they enter the locking grooves 40 as detailed herein. This prevents the two capture members 22 and 24 from disengaging and further frictionally constrain the bag 10. Since the back side 8 of the bag 10 is stretched taut across the second capture member 24, the teeth force the material of the bag 10 up into the crescent shaped slots 34 of the first capture member 24 increasing the frictional engagement of the bag 10 in the bag holder 2. The bag 10 now hang agap, ready for the insertion of material/garbage. The bag 10 is removed by the application of pressure to the release tab 32 of the top capture member 22.

In the preferred embodiment, the bag holder 2 is fabricated from a polymer although it could be made from a thin metal, carbon fiber or other lightweight, ridged material.

While certain features and aspects have been described with respect to exemplary embodiments, one skilled in the art will recognize that numerous modifications are possible. Most importantly the bag holder 2 may have the first capture member 22 and the second capture reversed with the release tab located on the second capture member 24 and the base flange 28 extending from the first capture member 22.

Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A bag holder, comprising:
   a cylindrical first capture member having an internal side wall with an internal diameter, a planar top plate with two opposing crescent shaped slots formed therethrough and a release tab extending therefrom, and a partially circumferential locking groove formed in said internal side wall where said internal side wall and said top plate intersect;
   a second cylindrical capture member with a planar solid floor, an external side wall with a top edge, and two sets of teeth extending from said top edge and disposed 180 radial degrees apart on said top edge and aligned for passage through said crescent shaped slots, said external side wall having a partially circumferential locking tab with chamfered edges extending therefrom that resides adjacent said top edge, said external side wall having an external diameter smaller than said internal diameter of said internal side wall and sized for frictional engagement upon insertion of said external side wall of said second capture member into said internal side wall of said first capture member; and wherein said second capture member is releasably, frictionally engageable within said first capture member; and wherein said locking tab is releasably engageable in said locking groove when said first capture member and said second capture member are frictionally engaged.

2. The bag holder of claim 1 further comprising;
a hinge means disposed between said first capture member and said second capture member.

3. The bag holder of claim 2 wherein there are two of said partially circumferential locking grooves and two of said partially circumferential locking tabs.

4. The bag holder of claim 2 further comprising:
wherein said teeth reside therein said crescent shaped slots when said first capture member and said second capture member are engaged.

5. The bag holder of claim 1 further comprising:
said planar solid floor extending perpendicularly outward from a bottom edge of said second capture member, said base flange having a mounting orifice formed therethrough.

6. The bag holder of claim 5 further comprising:
a pair of base flange cutouts formed therethrough said planar solid floor.

7. The bag holder of claim 5 further comprising an adhesive means affixed to a bottom face of said planar solid floor.

8. A bag holder, consisting of:
a cylindrical first capture member having an internal side wall with an internal diameter, a planar top plate with two opposing crescent shaped slots formed therethrough and a release tab extending therefrom, and a partially circumferential locking groove formed in said internal side wall where said internal side wall and said top plate intersect;

a second cylindrical capture member with a planar solid floor, an external side wall with a top edge, and two sets of teeth extending from said top edge and disposed 180 radial degrees apart on said top edge and aligned for passage through said crescent shaped slots, said external side wall having a partially circumferential locking tab with chamfered edges extending therefrom that resides adjacent said top edge, said external side wall having an external diameter smaller than said internal diameter of said internal side wall and sized for frictional engagement upon insertion of said external side wall of said second capture member into said internal side wall of said first capture member; and a hinge means connecting said first capture member to said second capture member; and wherein said second capture member is releasably, frictionally engageable within said first capture member; and wherein said locking tab is releasably engageable in said locking groove when said first capture member and said second capture member are frictionally engaged.

* * * * *